pagination (12) United States Patent (10) Patent No.: US 8,784,914 B2
Leloup et al. (45) Date of Patent: Jul. 22, 2014

(54) BEVERAGE CAPSULE WITH GREEN COFFEE EXTRACT AND METHOD OF MAKING SAID EXTRACT

(75) Inventors: Valerie Martine Jeanine Leloup, Orbe (CH); Yves Allenbach, Orbe (CH); Johanna Hendrika Schoonman, Montreux (CH)

(73) Assignee: Nestec S.A., Vevey (CH)

( * ) Notice: Subject to any disclaimer, the term of this patent is extended or adjusted under 35 U.S.C. 154(b) by 126 days.

(21) Appl. No.: 13/516,445

(22) PCT Filed: Dec. 7, 2010

(86) PCT No.: PCT/EP2010/069011
§ 371 (c)(1),
(2), (4) Date: Jun. 15, 2012

(87) PCT Pub. No.: WO2011/073052
PCT Pub. Date: Jun. 23, 2011

(65) Prior Publication Data
US 2012/0251678 A1 Oct. 4, 2012

(30) Foreign Application Priority Data

Dec. 18, 2009 (EP) .................................... 09179816

(51) Int. Cl.
*A23F 5/26* (2006.01)
(52) U.S. Cl.
USPC ............................ 426/112; 426/433; 426/432
(58) Field of Classification Search
USPC .......................... 426/433, 112, 432
See application file for complete search history.

(56) References Cited

U.S. PATENT DOCUMENTS

| 2,278,473 | A | | 7/1942 | Musher | |
|---|---|---|---|---|---|
| 4,938,978 | A | * | 7/1990 | Husaini | ......................... 426/461 |
| 5,114,731 | A | | 5/1992 | Belville | |
| 2004/0105908 | A1 | * | 6/2004 | Suzuki et al. | ................. 424/776 |
| 2004/0151822 | A1 | | 8/2004 | Slaga et al. | |
| 2007/0042101 | A1 | | 2/2007 | Troplin | |

FOREIGN PATENT DOCUMENTS

| CA | 2067515 | | 11/1992 |
|---|---|---|---|
| DE | 19605948 | | 8/1997 |
| EP | 366895 | | 9/1990 |
| EP | 512468 | | 11/1992 |
| EP | 826308 | | 4/1998 |
| EP | 916267 | | 5/1999 |
| EP | 1674106 | | 5/2004 |
| EP | 1636095 | | 3/2006 |
| FR | 2856244 | | 12/2004 |
| WO | 02085397 | | 10/2002 |
| WO | 2006103515 | | 5/2006 |
| WO | 2006108578 | | 10/2006 |
| WO | WO 2008/107645 | * | 9/2008 |
| WO | 2009132889 | | 5/2009 |

OTHER PUBLICATIONS

PCT International Search Report for Application No. PCT/EP2010/069011 with a Mailing Date of Jul. 3, 2011. 4 Pages.
Written Opinion of the PCT International Searching Authority for Application No. PCT/EP2010/069011 with a Mailing Date of Jul. 3, 2011. 6 Pages.

* cited by examiner

*Primary Examiner* — Anthony Weier
(74) *Attorney, Agent, or Firm* — K&L Gates LLP

(57) ABSTRACT

The present invention relates to a method of producing an extract of green coffee wherein green coffee beans are subjected to a heat treatment and extracted without being roasted.

16 Claims, No Drawings

BEVERAGE CAPSULE WITH GREEN COFFEE EXTRACT AND METHOD OF MAKING SAID EXTRACT

CROSS REFERENCE TO RELATED APPLICATIONS

The present application is a National Stage of International Application No. PCT/EP2010/069011, filed on Dec. 7, 2010, which claims priority to European Patent Application No. 09179816.5, filed on Dec. 18, 2009, the entire contents of which are being incorporated herein by reference.

FIELD OF THE INVENTION

The present invention relates to a method of producing an extract of green coffee wherein green coffee beans are subjected to a heat treatment and extracted.

BACKGROUND

Coffee has traditionally been consumed primarily for its taste and aroma and/or the stimulating effect of caffeine. The specific taste and aroma is to a great extent formed during roasting of the coffee beans. In recent years an increasing amount of scientific literature has pointed at the health benefits of antioxidants in foods. Coffee comprises antioxidants in high amounts, e.g. chlorogenic acids, and may serve as an important source of antioxidants in the diet. However, it is known that chlorogenic acids are degraded during roasting of coffee. Extracts of green coffee are used in food supplements and as an additive in food and beverage products to provide an increased amount of antioxidants. EP1674106A1 discloses a dietetic composition comprising extract of green coffee. A coffee beverage brewed directly from green coffee does not have the characteristic taste and aroma normally associated with coffee. WO 2006/108578 discloses a coffee product made from a combination of roasted and green coffee which combines the high level of antioxidants of the green coffee with the taste and aroma of roasted coffee. When ground green coffee beans are extracted, the extract may comprise native proteins that may lead to allergenic reactions in some persons. There is a need for coffee based beverages rich in antioxidants and with a pleasant and attractive taste and aroma, and for a method of extracting ground green coffee beans without extracting native proteins with allergenic properties.

SUMMARY OF THE INVENTION

The inventors have found that extraction of green coffee beans that has been subjected to a heat treatment, but not roasted, produces a coffee extract rich in antioxidants with a new pleasant attractive taste and aroma. Therefore, the present invention relates to a method of producing a coffee extract, comprising a) heat treating green coffee beans at a temperature between 100° C. and 180° C. for at least 5 minutes keeping the moisture level between 6% and 50% of the total weight of the coffee beans; and b) extracting the treated coffee beans of step a) to produce a liquid coffee extract; wherein the coffee beans and/or the coffee extract is not subjected to roasting. The invention further relates to a capsule for preparing a beverage.

DETAILED DESCRIPTION OF THE INVENTION

According to the present invention green coffee beans are subjected to a heat treatment. By the term green coffee beans is meant raw coffee beans that have not been roasted or subjected to other severe heat treatment. The production of green coffee beans is well known in the art and involves removing the skin and pulp layers surrounding the bean from the coffee cherry, leaving the raw coffee bean. The bean may be washed and dried. Green coffee beans according to the invention may be a coffee bean of any variety, e.g. Arabica or Robusta Heat Treatment The heat treatment of the green beans may be performed in any suitable manner keeping the amount of moisture in the beans at the desired level. In a preferred embodiment of the invention, the heat treatment is performed by contacting green coffee beans with steam. The treatment may be performed in a closed chamber wherein the pressure is increased as temperature increases, or it may e.g. be performed at atmospheric pressure. In a preferred embodiment an atmosphere of saturated steam is kept in the heating chamber. The treatment is performed at a temperature between 100° C. and 180° C., preferably between 120° C. and 160° C., more preferably between 130° C. and 160° C. The treatment is performed for at least 5 minutes, preferably for between 5 minutes and 180 minutes. The duration of the treatment may depend on the temperature of the treatment. In one embodiment the treatment is performed at a temperature between 100° C. and 130° C. for between 15 minutes and 180 minutes, preferably for between 25 minutes and 180 minutes. In another embodiment the treatment is performed at a temperature between 130° C. and 160° C. for between 20 minutes and 120 minutes, preferably for between 30 minutes and 90 minutes.

During the treatment the moisture content of the coffee beans is kept at between 6% and 50% (% by weight). In this way the coffee beans are kept moist without major amounts of free liquid being present. This moisture level ensures that no extraction of the beans take place during the heat treatment. In a preferred embodiment the moisture level is kept between 6% and 30%, more preferred between 6% and 20%, most preferred between 8% and 15%.

The green coffee beans being subjected to the heat treatment may be whole or ground coffee beans. Ground beans may be produced by methods well known in the art for grinding coffee beans. The green coffee beans may e.g. be ground before or after the heat treatment. In a preferred embodiment the green coffee beans to be heat treated are whole coffee beans. After the heat treatment the beans may be dried, e.g. if the heat treated beans will be stored before the extraction step. Drying may be performed by any suitable method, ensuring that roasting does not take place. If drying is performed, it is preferable that the temperature does not exceed 180° C. during drying.

Extraction

The green coffee beans having been subjected to the heat treatment of the invention are extracted to produce a liquid coffee extract. Extraction of the treated green coffee beans may be performed by any suitable method, e.g. using water, ethanol, or any other suitable solvent. In a preferred embodiment, the heat treated green coffee beans are extracted with an aqueous liquid, such as water or a water based coffee extract. Extraction of coffee beans is well known in the art and may e.g. be performed by the methods disclosed in EP0826308 and/or EP0916267. The heat treated green coffee beans to be extracted may be whole or ground. If whole green beans have been subjected to the heat treatment step, they may be ground before extraction or they may be extracted as whole beans. In the method of the invention the green coffee beans may thus be ground before or after the heat treatment, or they may remain whole during the process of the invention.

The green coffee extract obtained may further be concentrated, e.g. by filtration or evaporation, and/or it may be dried to a powder, e.g. by spray drying or freeze drying. In one embodiment the extraction is performed in a coffee brewing device for use at home by a consumer, in a cafeteria, restaurant, bar or the like. Such brewing devices and their operation are well known in the art. This may e.g. be a normal filter brewing device or it may be a coffee or beverage machine for the extraction of beverage substances in a capsule. Such machines are well known in the art, and generally use capsules containing a beverage substance, e.g. roast and ground and/or soluble coffee, that can be extracted or dissolved when a liquid, typically water, is injected into the capsule. For this purpose, green coffee that has been heat treated according to the invention may be placed in a suitable capsule for extraction. Suitable capsules are well known in the art, e.g. from EP0512468. Accordingly, in one embodiment the invention relates to a capsule for preparing a beverage by injection of a fluid, comprising a closed chamber and a means for allowing the said beverage to flow out, the closed chamber of said capsule comprising ground green coffee beans that has been heat treated at a temperature between 100° C. and 180° C. for at least 5 minutes keeping the moisture level between 6% and 50% of the total weight of the coffee beans, wherein the green coffee beans have not been subjected to roasting. In a preferred embodiment the volume of the closed chamber of the capsule is between 10 and 100 ml, preferably between 20 and 60 ml.

Roasting

The green coffee beans being treated with the method of the invention, and/or the coffee extract of the invention, are not roasted before or during the treatment of the method of the invention. By roasting is meant a dry, or almost dry, heat treatment of the coffee beans or coffee extract as opposed to e.g. steaming or cooking of coffee beans in water, e.g. under pressure. During roasting of coffee beans drying takes place. The green beans will usually comprise about 12-16% water before roasting, and as a result of the roasting the moisture level will be reduced, e.g. to about 2%. Roasting is thus different from a heat treatment in water or with steam. The purpose of roasting of coffee is usually to develop the specific flavour notes characteristic of roasted coffee. These flavours result from processes such as e.g. pyrolisation of coffee solids and Maillard reactions.

In one embodiment of the invention, roasting means a heat treatment at a temperature above 200° C. at a moisture level below 4% (by weight), preferably below 3%. The moisture level is understood as the proportion of water contained in the coffee beans or coffee extract being roasted. As explained above, the moisture level at the beginning of the roasting may be higher than 4%, but during roasting the moisture level is reduced to below 4%, preferably below 3%.

Chlorogenic Acids

Chlorogenic acids are compounds with antioxidant activity. For the purpose of the present invention, the amount of chlorogenic acids is determined as the sum of the amounts of the chlorogenic acid homologues 3-caffeoylquinic acid (3-CQA), 4-caffeoylquinic acid (4-CQA), 5-caffeoylquinic acid (5-CQA), 3,4 dicaffeoylqunic acid (3,4-diCQA), 3,5-dicaffeoylquinic acid (3,5-diCQA), 4,5-dicaffeoylquinic acid (4,5-diCQA), 4-feruloylquinic acid (4-FQA), and 5-feruloylquinic acid (5-FQA). The chlorogenic acid isomers may be determined by HPLC with UV detection at 320 nm using 5-CQA as external standard to calculate the concentrations.

An extract prepared by the method of the present invention preferably comprises more than 4 g of chlorogenic acids per gram of green coffee beans being extracted, more preferably more than 5 g of chlorogenic acids per gram of green coffee beans being extracted.

Food or Beverage Composition

In one embodiment of the method of the invention, the method further comprises preparing a food or beverage composition from an extract obtained by the heat treatment and extraction of the invention. A food or beverage composition according to the invention may be any food or beverage composition, including pet food composition, meant to be consumed by a human or animal, such as e.g. a beverage, e.g. a coffee beverage, a cocoa or chocolate beverage, a malted beverage, a fruit or juice beverage, a carbonated beverage, a soft drink, or a milk based beverage; a performance nutrition product, e.g. a performance nutrition bar, powder or ready-to-drink beverage; a medical nutrition product; a dairy product, e.g. a milk drink, a yogurt or other fermented dairy product; an ice cream product; a confectionary product, e.g. a chocolate product; a functional food or beverage, e.g. a slimming product, a fat burning product, a product for improving mental performance or preventing mental decline, or a skin improving product.

A beverage according to the invention may e.g. be in the form of a powder or liquid concentrate to be mixed with a suitable liquid, e.g. water or milk, before consumption; or a ready-to-drink beverage. If the beverage composition is in the form of a powder it may further comprise e.g. creamer, sweetener, flavouring agents, and/or any other ingredient suitable for being included in a powdered beverage product. By a ready-to-drink beverage is meant a beverage in liquid form ready to be consumed without further addition of liquid. A beverage according to the invention may comprise any other suitable ingredients known in the art for producing a beverage, such as e.g. sweeteners, e.g. sugar, such as invert sugar, sucrose, fructose, glucose, or any mixture thereof, natural or artificial sweetener; aromas and flavours, e.g. fruit, cola, coffee, or tea aroma and/or flavour; fruit or vegetable juice or puree; milk; stabilizers; emulsifiers; natural or artificial colour; preservatives; antioxidants, e.g. ascorbic acid; and the like. Any suitable acid or base may be used to achieve a desired pH of the product, e.g. citric acid or phosphoric acid. A beverage of the invention may be carbonated, carbon dioxide may be added by any suitable method known in the art.

EXAMPLES

Example 1

Whole green Robusta coffee beans were heat treated at 135° C. for 60 minutes with steam. The treated beans were ground using a Retsch Mill with a 2 mm sieve. The ground beans were extracted with distilled water in a two stage extraction process, first at 100° C. for 10 min, and then at 180° C. for 10 minutes. The obtained extract was freeze-dried.

A control extract sample was prepared by grinding whole green Robusta beans and producing and extract as described above without prior heat treatment.

The protein content of the samples were analysed by gel electrophoresis (NuPAGE) with a number of known protein standards with molecular weights between 2.5 and 200. No native proteins could be detected in the extract of heat treated beans, whereas the control extract showed intact protein bands.

The following extraction yields were obtained (% of total coffee solids extracted):

|  | Control | Heat treated green coffee beans |
|---|---|---|
| First extraction step | 20 | 22 |
| Second extraction step | 19 | 21 |
| Total | 39 | 43 |

Example 2

Whole green beans of Robusta coffee were subjected to heat treatment under various conditions. For each set of conditions 10 kg of green beans were treated in an autoclave at the time temperature and moisture level given in the table below. The heating time to reach the desired temperature was between 4 and 12 minutes. After treatment the coffee beans were cooled by cold water in the double coat of the autoclave to 50° C., cooling time varied between 15 and 22 minutes. The heat treated green coffee beans were ground in a Freezer Mill 6800 to an average particle size below 100 micrometer. Moisture was determined by drying for 4 hours at 102° C. in an oven. The ground coffee beans were extracted at 40° C. in 70% aqueous methanol using ASE200 Dionex extractor. Chlorogenic acids (CA) were determined in the extract by chromatographic separation on Spherisorb ODS1 (250 mm×4) using a water/acetonitrile/phosphate gradient and detected by UV (320 nm). Results are given below, moisture and chlorogenic acids (CA) are expressed as % of initial green coffee weight.

| Temperature ° C. | Time min | Moisture % | CA % |
|---|---|---|---|
| control |  | 9.8 | 10.82 |
| 120 | 30 | 9.8 | 10.01 |
| 120 | 38 | 10.2 | 10.08 |
| 120 | 50 | 9.9 | 9.43 |
| 120 | 67 | 9.7 | 9.50 |
| 120 | 90 | 9.8 | 9.68 |
| control |  | 9.8 | 10.82 |
| 130 | 26 | 9.2 | 9.87 |
| 130 | 39 | 9.6 | 9.25 |
| 130 | 58 | 9.1 | 8.73 |
| 130 | 84 | 10.2 | 8.92 |
| 130 | 120 | 9.3 | 7.96 |
| control |  | 9.8 | 10.82 |
| 140 | 22 | 9.7 | 9.38 |
| 140 | 36 | 10.3 | 8.56 |
| 140 | 55 | 9.6 | 7.70 |
| 140 | 82 | 9.3 | 7.18 |
| 140 | 120 | 9.9 | 6.87 |
| control |  | 9.8 | 10.82 |
| 150 | 18 | 10.5 | 8.31 |
| 150 | 32 | 9.6 | 7.92 |
| 150 | 52 | 9.8 | 7.09 |
| 150 | 81 | 10.1 | 6.24 |
| 150 | 120 | 9.5 | 5.42 |
| control |  | 9.8 | 10.82 |
| 160 | 14 | 10.0 | 7.52 |
| 160 | 20 | 8.7 | 6.96 |
| 160 | 30 | 9.5 | 6.10 |
| 160 | 42 | 8.8 | 5.74 |
| 160 | 60 | 8.2 | 4.81 |
| control |  | 9.8 | 10.82 |
| 170 | 10 | 8.9 | 6.17 |
| 170 | 13 | 8.7 | 5.56 |
| 170 | 17 | 8.5 | 5.67 |
| 170 | 22 | 8.4 | 5.09 |
| 170 | 30 | 7.6 | 4.57 |

The invention claimed is:

1. A method of producing a coffee extract, comprising:
   a) heat treating green coffee beans at a temperature of between 100° C. and 180° C. for at least 5 minutes and maintaining the moisture level between 6% and 20% of the total weight of the coffee beans; and
   b) extracting the treated coffee beans of step a) to produce a liquid coffee extract,
   wherein the coffee beans and/or the coffee extract is not subjected to roasting.

2. The method of claim 1 wherein the green coffee beans are heat treated at a temperature of between 130° C. and 160° C. for 20 minutes to 120 minutes in step a).

3. The method of claim 1 wherein the heat treatment of step a) is performed by contacting green coffee beans with steam.

4. The method of claim 1 comprising grinding the coffee beans.

5. The method of claim 1 wherein the heat treated green coffee beans are extracted with an aqueous liquid in step b).

6. The method of claim 1 comprising drying the extract obtained in step b).

7. The method of claim 1 wherein the extract obtained in step b) comprises more than 4 g of chlorogenic acids per gram of green coffee beans being extracted.

8. The method of claim 1 comprising preparing a food or beverage composition from the extract obtained after step b).

9. The method of claim 8 wherein the food or beverage composition is a powdered beverage product.

10. A capsule for preparing a beverage by injection of a fluid, comprising a closed chamber and a member for allowing the beverage to flow out of the chamber, the closed chamber of the capsule comprising ground green coffee beans that have has been heat treated at a temperature of between 100° C. and 180° C. for at least 5 minutes while maintaining the moisture level between 6% and 20% of the total weight of the coffee beans, the green coffee beans have not been subjected to roasting.

11. The capsule of claim 10 wherein the volume of the closed chamber is between 10 and 100 ml.

12. The capsule of claim 10 wherein the moisture level was maintained between 8% and 15% of the total weight of the coffee beans while the coffee beans were heat treated.

13. The method of claim 1 wherein the green coffee beans are heat treated at a temperature between 130° C. and 160° C. for 30 minutes to 90 minutes in step a).

14. The method of claim 1 wherein the green coffee beans are heat treated at a temperature between 100° C. and 130° C. for 25 minutes to 180 minutes in step a).

15. The method of claim 1 wherein the moisture level is maintained between 8% and 15% of the total weight of the coffee beans while the coffee beans are heat treated in step a).

16. The method of claim 6 wherein the extract is dried at a temperature less than 180° C.

* * * * *